UNITED STATES PATENT OFFICE.

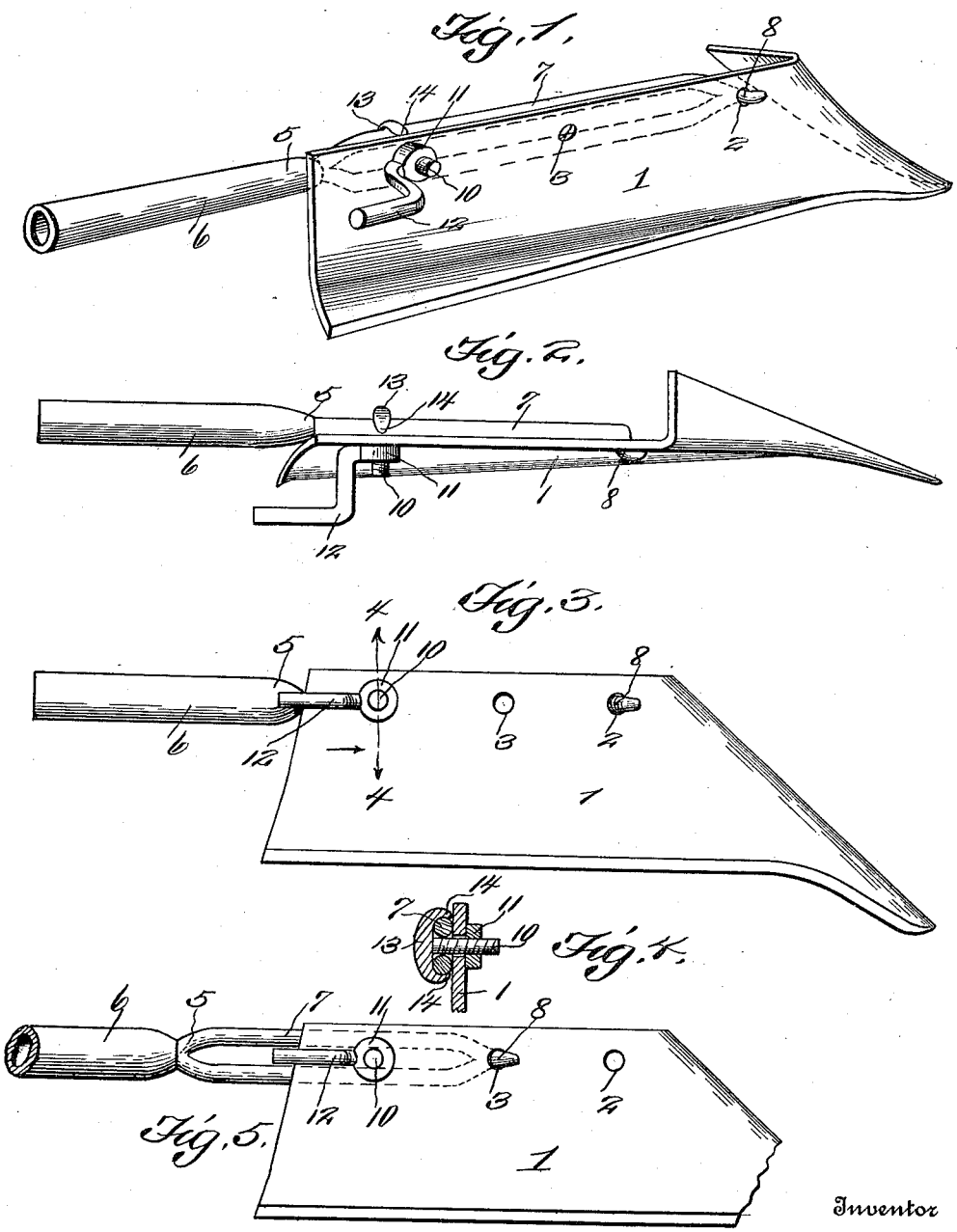

DURWARD D. CONLEY, OF FLORA, OREGON.

PLOW-POINT HOLDER.

1,006,724.   Specification of Letters Patent.   Patented Oct. 24, 1911.

Application filed March 6, 1911. Serial No. 612,460.

*To all whom it may concern:*

Be it known that I, DURWARD D. CONLEY, a citizen of the United States, residing at Flora, in the county of Wallowa and State of Oregon, have invented a new and useful Plow-Point Holder; and I do hereby declare the following to be a full, clear, and exact description of the invention, such as will enable others skilled in the art to which it appertains to make and use the same.

This invention relates to a new and useful plow share holder.

The invention, in its broadest aspect, aims as its primary object to provide a holder of this design, for holding plow shares or lays while being sharpened.

Another feature of the invention is a holder comprising a handle, a looped shank terminating into an L-shaped lug at its end to engage through a hole of the plow share or lay, in such wise as to allow the looped shank to lie adjacent to the flat face of the plow share, in combination with a T-shaped bolt having lateral extending hooked ends to engage the sides of the looped shank, with the shank of the bolt extending through the looped shank and the plow share and provided with means threaded to the shank for holding the share securely to the holder.

A further feature is the construction of the share with a plurality of apertures or holes, in order to allow the holder to be adjusted in one or more positions relative to the plow share or lay.

The invention comprises further features and combinations of parts, as hereinafter set forth, shown in the drawings and claimed.

In the drawings:—Figure 1 is a perspective view of a plow share or lay, showing the holder applied thereto and constructed in accordance with the invention. Fig. 2 is an edge view. Fig. 3 is a view in side elevation, in order to show the construction and contour of the holder. Fig. 4 is a cross sectional view on line 4—4 of Fig. 3. Fig. 5 is a view similar to Fig. 3 showing the holder adjusted in a different position.

Referring to the drawings, 1 designates the plow share or lay, which is provided with a plurality of apertures 2, 3 and 4, while 5 denotes the holder. The holder comprises the handle 6, and a looped shank 7. This looped shank terminates into an L-shaped laterally extending lug 8, which is designed to extend through one or the other of the apertures, as shown clearly in Figs. 1 and 2. The looped shank, while the plow share or lay is being sharpened, lies adjacent to one face or the other of the plow share, as shown in Figs. 1 and 2, in such a manner as to permit the shank 10 of the T-shaped bolt to extend through the loop and the aperture 4 of the plow share. However, the shank of the bolt may extend through the aperture 3 of the plow share, if it is desired. The shank of the bolt is threaded, as shown, and threaded to it is the member 11 which constitutes a nut for holding the bolt in place. This member 11 is provided with a laterally extending L-shaped arm or lever 12, whereby the member 11 may be rotated upon the threaded shank. The T-portion 13 of the bolt has its laterally extending end portions terminating in hooks 14, to engage about the sides of the looped shank, thus providing means for holding the shank in position, and further, serves to prevent the bolt from turning while the member 11 is being applied to the shank.

From the foregoing, in conjunction with the annexed drawings, one may observe that there has been devised a novel, practical, useful, efficient and cheap holder, and one which will stand the test in actual use.

The invention having been fully set forth, what is claimed as new and useful is:—

A holder adapted to plow shares having a series of apertures, said holder comprising a looped shank formed at one end with an L-shaped lug to engage one of the apertures and at the other end with an alining handle, and provided with a movable T-shaped clamping bolt and nut for holding the looped shank to the plow share.

In testimony whereof I have signed my name to this specification in the presence of two subscribing witnesses.

DURWARD D. CONLEY.

Witnesses:
GEO. W. PADDOCK,
G. W. JOHNSON.

Copies of this patent may be obtained for five cents each, by addressing the "Commissioner of Patents. Washington, D. C."